(12) United States Patent
Natori et al.

(10) Patent No.: US 8,017,903 B2
(45) Date of Patent: Sep. 13, 2011

(54) OBSERVATION APPARATUS

(75) Inventors: Yasuaki Natori, Tokyo (JP); Nobuyuki Nagasawa, Gunma (JP)

(73) Assignee: Olympus Corporation, Tokyo (JP)

( * ) Notice: Subject to any disclaimer, the term of this patent is extended or adjusted under 35 U.S.C. 154(b) by 336 days.

(21) Appl. No.: 12/326,419

(22) Filed: Dec. 2, 2008

(65) Prior Publication Data

US 2009/0140129 A1 Jun. 4, 2009

(30) Foreign Application Priority Data

Dec. 4, 2007 (JP) ................. 2007-313546

(51) Int. Cl.
*G01J 1/04* (2006.01)
(52) U.S. Cl. .................. 250/216; 250/239; 359/368
(58) Field of Classification Search ............. 250/216, 250/234, 239, 221, 458.1; 359/368, 385, 359/392; 600/473, 476
See application file for complete search history.

(56) References Cited

U.S. PATENT DOCUMENTS

| | | | |
|---|---|---|---|
| 7,801,589 B2 * | 9/2010 | Tanikawa et al. | ............. 600/476 |
| 2004/0095624 A1 | 5/2004 | Knebel et al. | |

FOREIGN PATENT DOCUMENTS

| | | |
|---|---|---|
| EP | 1 772 765 A1 | 4/2007 |
| JP | 2004-245979 A | 9/2004 |
| JP | 2006-154376 | 6/2006 |
| WO | WO 2004/097491 A1 | 11/2004 |

\* cited by examiner

*Primary Examiner* — Kevin Pyo
(74) *Attorney, Agent, or Firm* — Scully, Scott, Murphy & Presser, P.C.

(57) ABSTRACT

To prevent incidence of strong external light into a photodetector and an imaging device while a lid is opened, so as to thereby perform accurate photodetection and imaging operations without receiving the influence of external light. An observation apparatus comprising: a stage on which a sample serving as an observation target is placed; a detection unit which detects light from the sample; an imaging optical system which projects the light from the sample onto the detection unit; a light shielding member which covers the whole or a part thereof; an opening provided in the light shielding member; a lid which opens/closes the opening; an open/close detection unit which detects the open/close state of the lid; a dimmer which limits light incident into the detection unit; and a controller which operates the dimmer to reduce the amount of the light incident into the detection unit, when the open/close detection unit detects that the lid has been opened.

6 Claims, 5 Drawing Sheets

OBSERVATION APPARATUS

BACKGROUND OF THE INVENTION

1. Field of the Invention

The present invention relates to an observation apparatus.

This application is based on Japanese Patent Application No. 2007-313546, the content of which is incorporated herein by reference.

2. Description of Related Art

Some existing conventional microscopes to observe fluorescence emitted from a sample have comprised, for example: a device for placing the sample and the optical system into a dark box; with a mechanism which, when the lid of the dark box is opened, halts irradiation of light onto the sample as well as protecting the observer from harmful light. That is to say, a contrivance which controls irradiation of light onto the sample by linking with the opening/closing movement of the lid of the dark box, has been invented (for example, refer to Japanese Unexamined Patent Application, Publication No. 2004-245979).

This microscope of Japanese Unexamined Patent Application, Publication No. 2004-245979 comprises an epifluorescent light source which irradiates excitation light of a specific wavelength band onto a sample placed on a stage, wherein fluorescence that has been radiated from the sample with use of the excitation light is used for image formation in the optical system and observation. In addition, the microscope also comprises: a box-shaped light shielding member which covers the whole or a part of the fluorescence microscope to prevent incidence of external light onto the sample; a lid which opens/closes an opening provided in a part of the light shielding member; an open/close detection unit which detects the open/close state of the opening defined by the lid; a shutter which opens/closes an optical path from the epifluorescent light source to the sample; and a control circuit which controls the driving of the shutter on the basis of an output signal from the open/close detection unit. The control circuit is designed to control the shutter so as to allow light from the epifluorescent light source to pass through when the opening is closed, and to shield against the light from the epifluorescent light source when the opening part is opened.

However, in cases where faint light is to be detected, particularly such a case where luminescence from living cells is observed, highly sensitive photodetector and imaging device such as a photo counting unit using PMT (photomultiplier tube) and EM-CCD (electron multiplying charge-coupled device) are often used. In such highly sensitive photodetector and imaging device, once strong light has been received, many electric charges may be accumulated in the device or detection circuit and it may take a long time to discharge these electric charges. For example, in a photo counting unit using PMT, after strong light has been received, it may take several dozens of minutes to discharge electric charges. Moreover, in EM-CCD, once strong light has been received, previous electric charges remain in the following image data that will be taken out later, which leads to a disadvantage in that the light signal is left in the image data which is supposed to be dark.

For example, in cases where an observation apparatus in which a sample serving as an observation target and an optical system and an imaging device (EM-CCD) for detecting the image (light) thereof are covered with a dark box to prevent incidence of external light, is used to observe changes in the amount of luminescence while culturing the sample, for example, for several days; the sample, the optical system, and the imaging device can be usually set in a dark state in the dark box. However, the lid of the dark box has to be opened sometimes for an operation such as agent injection into the sample. Such a case brings about a problem in that the image data shows incorrect values after the lid has been opened, and a problem in that the background which is supposed to be dark turns to be a bright image.

BRIEF SUMMARY OF THE INVENTION

The present invention takes the above situation into consideration with an object of providing an observation apparatus which prevents incidence of strong external light into a photodetector and an imaging device while a lid is opened, so as to thereby perform accurate photodetection and imaging operations without receiving the influence of external light.

In order to achieve the above object, the present invention provides the following solutions.

The present invention provides an observation apparatus comprising: a stage on which a sample serving as an observation target is placed; a detection unit which detects light from the sample; an imaging optical system which projects the light from the sample onto the detection unit; a light shielding member which covers the whole or a part thereof; an opening provided in the light shielding member; a lid which opens/closes the opening; an open/close detection unit which detects the open/close state of the lid; a dimmer which limits light incident into the detection unit; and a controller which operates the dimmer to reduce the amount of the light incident into the detection unit, when the open/close detection unit detects that the lid has been opened.

According to the present invention, it becomes possible to prevent incidence of strong external light into the photodetector and the detection unit while the lid is opened, and even if the lid has been closed to restart photodetection and image detection, accurate photodetection and imaging operations can be performed without receiving the influence of external light.

In the above invention, the dimmer may be a shutter or a dimming filter.

The present invention provides an observation apparatus comprising: a stage on which a sample serving as an observation target is placed; a detection unit which detects light from the sample; an imaging optical system which projects the light from the sample onto the detection unit; a light shielding member which covers the whole or a part thereof; an opening provided in the light shielding member; a lid which opens/closes the opening; an open/close detection unit which detects the open/close state of the lid; a dimmer which limits light incident into the detection unit; and a controller which reduces a gain, an exposure time, or a photoelectric conversion efficiency of the detection unit, so as to thereby set the sensitivity low, when the open/close detection unit detects that the lid has been opened.

According to the present invention, by switching to the setting of preventing the generation of excessive electric charges, it becomes possible to prevent incidence of strong external light into the photodetector and the detection unit while the lid is opened, and even if the lid has been closed to restart photodetection and image detection, accurate photodetection and imaging operations can be performed without receiving the influence of external light.

In the above invention, the structure may be such that when it is detected that the lid has been closed from the opened state, photodetection operation or image detection operation is executed at least once in a state where the gain, the exposure time, or the photoelectric conversion efficiency of the detection unit is reduced.

By so doing, the influence of external light can be prevented by the operation of eliminating the influence due to external light.

The present invention demonstrates an effect of preventing incidence of strong external light into the photodetector and the imaging device while the lid is opened, so as to thereby enable accurate photodetection and imaging operations without receiving the influence of external light.

DETAILED DESCRIPTION OF THE INVENTION

Figure 1:
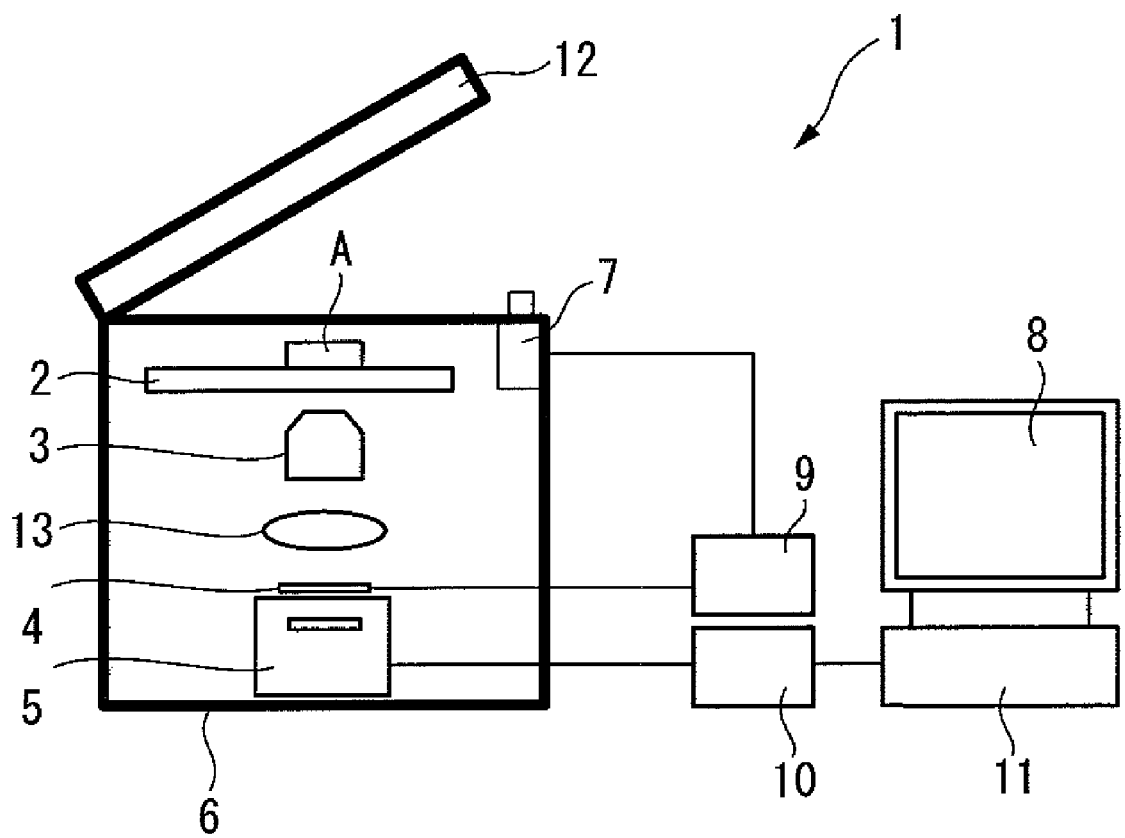
FIG. 1 is an overall schematic diagram of the observation apparatus according to a first embodiment of the present invention.

Hereunder is a description of an observation apparatus 1 according to a first embodiment of the present invention, with reference to FIG. 1. The observation apparatus 1 according to one embodiment of the present invention comprises: a stage 2 on which a sample A serving as the observation target is placed; a camera control circuit 10; an imaging device (camera) 5 such as EM-CCD or a detection unit such as a photodetector (PMT, APD: avalanche photodiode); an imaging optical system (for example, composed of an object lens 3 and an imaging lens 13) which detects light emitted from the sample A and projects the light onto the photodetector or the imaging device 5; a dark box 6 made of a light shielding member which covers the whole or a part of the sample A and the imaging device 5 to prevent irradiation of external light thereon; an opening provided in the dark box 6 to enable sample replacement and access to the sample; a lid 12 which opens/closes the opening; an open/close detection unit (detection switch) 7 which detects the open/close state of the lid 12; a shutter (or a dimmer/ND filter) 4 which shields against light incident into the photodetector or the imaging device 5; wherein a shutter control circuit 9 is operated to eliminate or reduce the amount of the light incident into the imaging device 5 when the open/close detection unit 7 detects that the lid has been opened.

More specifically, as shown FIG. 1, the observation apparatus 1 according to the present embodiment comprises: the stage 2 on which the sample A serving as the observation target is placed; the object lens 3 which captures the image of the sample A; the imaging lens 13 which receives light from the object lens 3 to form an image thereof on the imaging surface; the shutter 4 which shields against external light; the camera 5 which converts the image on the imaging surface into a picture signal; the dark box 6 which covers the whole thereof; the lid 12 which opens/closes the opening of the dark box 6; the detection switch 7 which detects the open/close state of the lid 12; the shutter control circuit 9 which controls the opening/closing status of the shutter 4; the camera control circuit 10 which controls the exposure time of the camera 5 and processes the picture signal; a PC 11 which performs image processing and the like; and a monitor 8 which displays the image.

For example, in cases where faint light such as a luminous phenomenon of cells is detected, as shown in FIG. 1, the sample A serving as the observation target, and the object lens 3, the imaging lens 13, and the camera 5 for detecting light from the sample A are placed in the dark box 6, and the opening is closed by the lid 12 so as to thereby create a state where no external light enters, followed by detection of light from the sample A.

The camera 5 for detecting such faint light is very highly sensitive whereas, if strong light above a certain degree is incident therein, too many electric charges may be sometimes provided through photoelectric conversion; in which case, all of these electric charges can not be processed within a single-time image transmission, and unprocessed electric charges remain for the next image transmission, as a result of which the background of the next image after the receipt of the strong light turns to be bright. That is to say, a disadvantage is brought about in that the background which is supposed to be dark turns to be non-dark.

In cases where a luminous phenomenon or the like of the sample A is observed, the apparatus is used by covering the opening with the lid 12 to prevent incidence of external light; however, for example, in cases where changes in the luminous phenomenon are observed for several days, an operation such as agent injection into the sample A or access to the sample A may be sometimes required during the observation process. In this case, the lid 12 has to be opened. When the lid 12 is opened, external light is let incident into the camera 5 through the optical system such as the object lens 3. Then, upon image acquisition after the lid 12 has been closed again, excessive electric charges remain in the image which is supposed to be dark. This causes a disadvantage in that the background turns to be a bright image.

In the present embodiment, the detection switch 7 which detects the open/close state of the lid 12 is provided so that, when the switch detects that the lid 12 has been opened from the closed state, the signal is transmitted to the shutter control circuit 9 and the shutter control circuit 9 controls the shutter to be closed. By performing such an operation, incidence of external light into the camera 5 can be prevented while the lid 12 is opened, and the occurrence of the abovementioned problem can be avoided.

Figure 2:
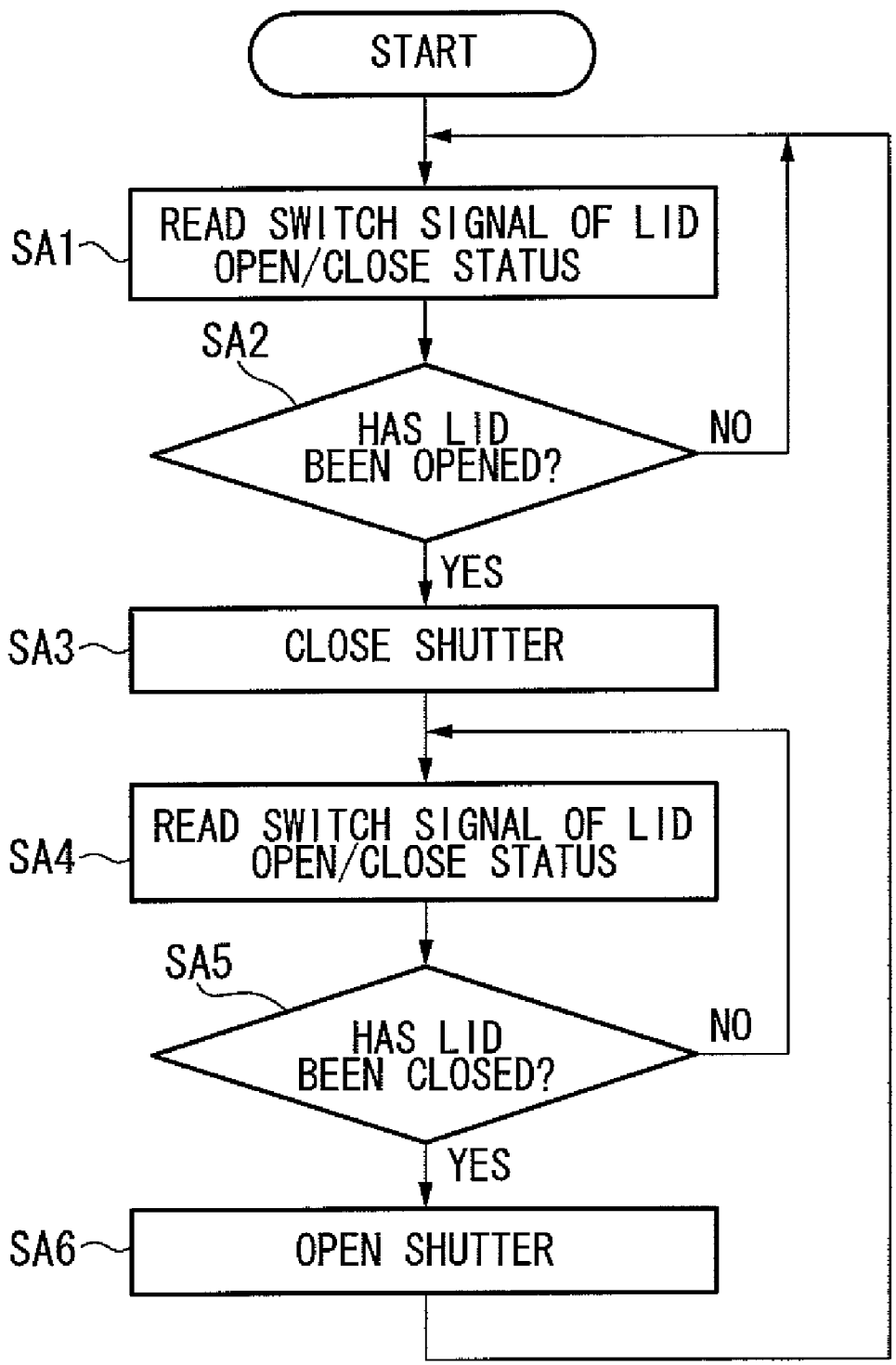
FIG. 2 is a flowchart showing the operation of the observation apparatus according to the first embodiment of the present invention.

FIG. 2 shows a flowchart of the operation of the first embodiment. The open/close state of the lid 12 of the dark box 6 is determined by reading the signal from the detection switch 7 (SA1). If it is determined that the lid 12 is closed, the operation of reading the signal from the detection switch 7 (SA1) is again repeatedly performed. If it is determined that the lid 12 has been opened (SA2), the operation of closing the shutter 4 (SA3) is executed. Similarly, the open/close state of the lid 12 is determined by reading the signal from the detection switch 7. If it is determined that the lid 12 is opened, the operation of reading the signal from the detection switch 7 (SA4) is again repeatedly performed.

If it is determined that the lid 12 has been closed (SA5), the operation of opening the shutter 4 is executed (SA6). Then, the flow goes back to the start point and the operation of reading the status of the lid 12 (SA1) is repeatedly executed.

In the present embodiment, the shutter 4 is used to shield against light. However, instead of the shutter 4, a dimmer such as an ND filter may also be used. In addition, equivalent effects can be obtained if a dimmer is combined into the shutter 4 to a degree not to cause the abovementioned problem. If such a dimmer is used, a transmission image of the sample A or the like can also be observed in a state where the lid 12 is opened, since light incident into the camera 5 is not zero.

Moreover, the structure may also be such that both of the shutter 4 and the dimmer such as an ND filter are set in front of the camera 5 so that, after the lid 12 has been opened, both of the shutter 4 and the ND filter can be operated to shield against light incident into the camera 5.

Further, as required, a mechanism may also be arranged such that the lid 12 can not be opened unless the shutter (or a dimmer/ND filter) 4 for shielding against light incident into the imaging device 5 is closed.

By so doing, it becomes possible to keep the shutter 4 opened by the operation of the observer. By exclusively opening the shutter 4 as required, the image of the sample A can be observed with the camera 5 using transmitted light from external light in the state where the lid 12 is opened.

Figure 3:
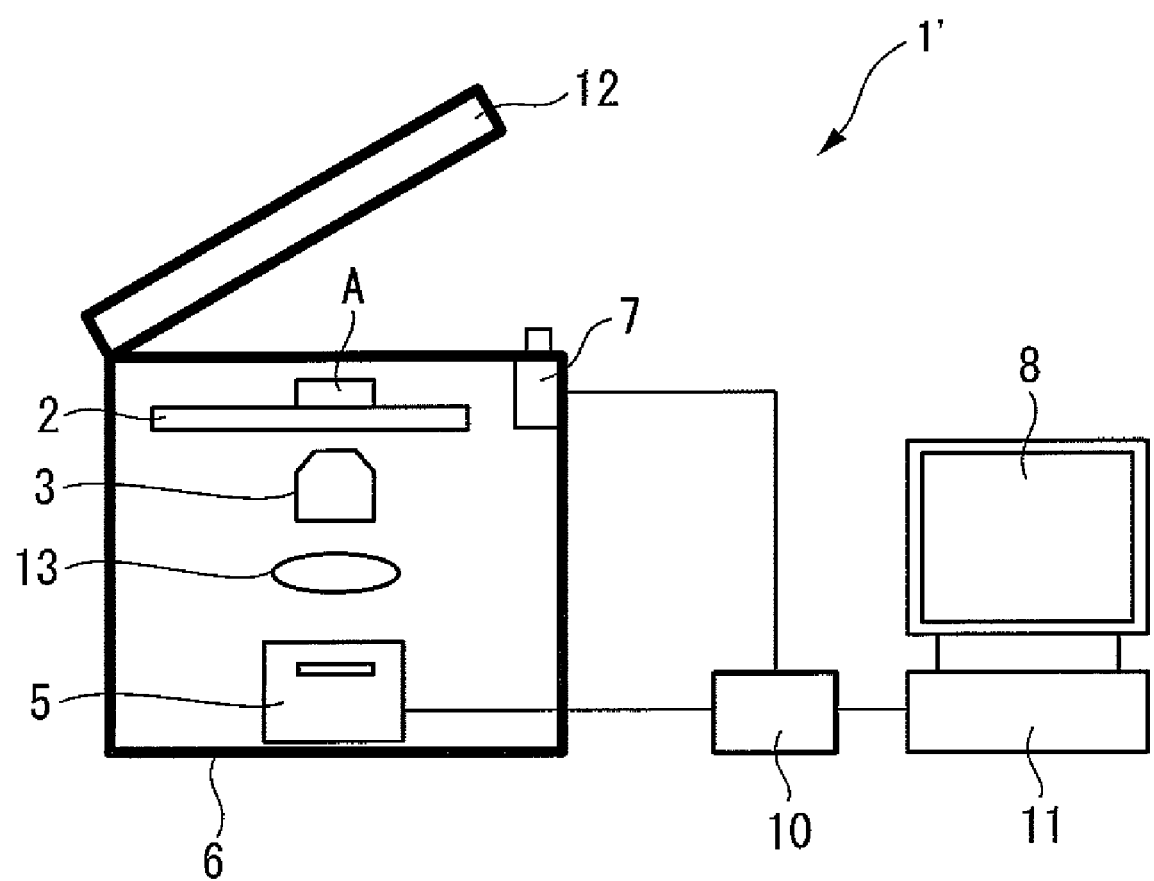
FIG. 3 is an overall schematic diagram of the observation apparatus according to a second embodiment of the present invention.

As shown in FIG. 3, the observation apparatus 1' according to the second embodiment of the present invention comprises: the stage 2 on which the sample A serving as the observation target is placed; the object lens 3 which captures the image of the sample A; the imaging lens 13 which receives light from the object lens 3 to form an image thereof on the imaging surface; the camera 5 which converts the image on the imaging surface into a picture signal; the dark box 6 which covers the whole of these devices; the lid 12 which opens/closes the opening of the dark box 6; the detection switch 7 which detects the open/close state of the lid 12; the camera control circuit 10 which controls the exposure time of the camera 5 and processes the picture signal; the PC 11 which performs image processing and the like; and the monitor 8 which displays the image. The observation apparatus 1' of the present embodiment takes a structure in which the signal from the detection switch 7 of the lid 12 is detected by the camera control circuit 10.

In the present embodiment, similarly to the first embodiment, the detection switch 7 which detects the open/close state of the lid 12 is provided so that, when the detection switch 7 detects that the lid 12 has been opened from the closed state, the signal is transmitted to the camera control circuit 10 and the camera control circuit 10 controls to lower the detection sensitivity of the camera 5, or to shorten the exposure time thereof, so as to switch to the setting of preventing the generation of excessive electric charges in the camera 5. By performing such an operation, the abovementioned problem due to external light while the lid 12 is opened, can be avoided so that accurate photodetection and imaging operations can be performed without receiving the influence of external light.

Figure 4:
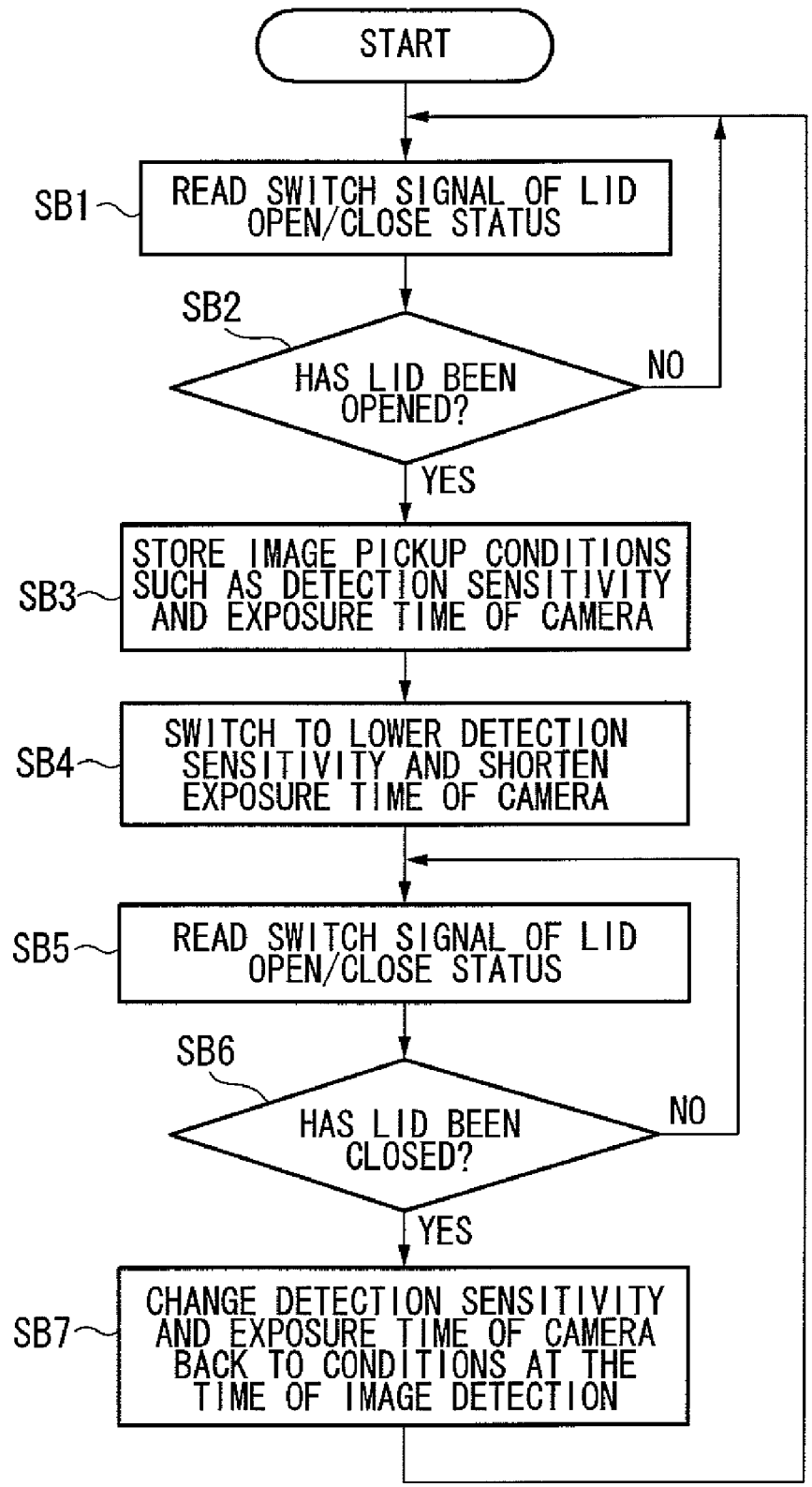
FIG. 4 is a flowchart showing the operation of the observation apparatus according to the second embodiment of the present invention.

FIG. 4 shows a flowchart of the operation of the second embodiment. The open/close state of the lid 12 of the dark box 6 is determined by reading the signal from the detection switch 7 (SB1). If it is determined that the lid 12 is closed, the operation of reading the signal from the detection switch 7 (SB1) is again repeatedly performed. If it is determined that the lid 12 has been opened (SB2), the detection sensitivity and the exposure time of the camera 5 at this time are stored (SB3), and then a setting to lower the detection sensitivity of the camera 5 and a setting to shorten the exposure time thereof are made (SB4). Similarly, the open/close state of the lid 12 of the dark box 6 is determined by reading the signal from the detection switch 7 (SB5). If it is determined that the lid 12 is opened, the operation of reading the signal from the detection switch 7 is again repeatedly performed. If it is determined that the lid 12 has been closed (SB6), the operation of changing the detection sensitivity and the exposure time of the camera 5 back to the previously stored conditions at the time of image acquisition, is executed (SB7). Then, the flow goes back to the start point and the operation of reading the status of the lid 12 (SB1) is repeatedly performed.

Figure 5:
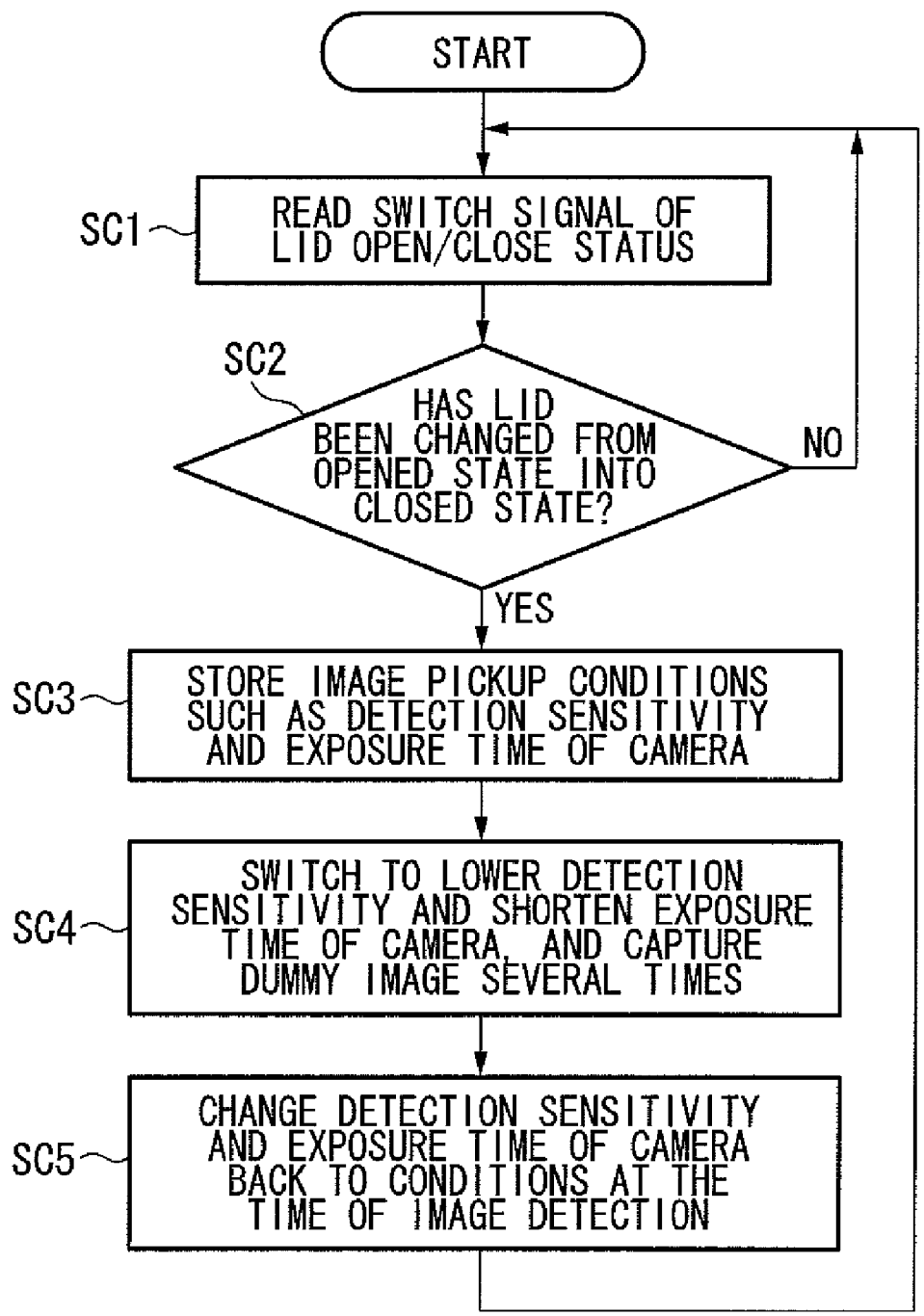
FIG. 5 is an overall schematic diagram of the observation apparatus according to a third embodiment of the present invention.

Hereunder is a description of the observation apparatus according to a third embodiment of the present invention, with reference to FIG. 5.

In the description of the present embodiment, the same reference symbols are used for components the structures of which are common with those of the observation apparatus 1' according to the second embodiment mentioned above, and description thereof is omitted. In the third embodiment, when it is detected that the lid 12 has been closed from the opened state, then a setting to lower the detection sensitivity of the camera 5 or to shorten the exposure time thereof is made, followed by dummy image detection and image data transmission at least once to perform the operation of discharging the excessive electric charges that have been accumulated in the camera 5. Then, the detection sensitivity and the exposure time are set to suitable values for usual image detection. In this manner, the influence of external light can be prevented by introducing the operation of eliminating the influence due to external light at the time when the lid 12 is closed and the atmosphere becomes dark from the state where the lid 12 has been opened and external light enters.

FIG. 5 shows a flowchart of the operation of the third embodiment. The open/close state of the lid 12 of the dark box 6 is determined by reading the signal from the detection switch 7 (SC1) to confirm whether or not the lid 12 has been changed from the opened state into the closed state (SC2). If it is determined that the lid 12 has not been changed from the opened state into the closed state, the operation of reading the signal from the detection switch 7 (SC1) is again repeatedly performed. If it is determined that the lid 12 has been changed from the opened state into the closed state, image pickup conditions such as the detection sensitivity and the exposure time at this time are stored (SC3). Then, settings to lower the detection sensitivity of the camera 5 and to shorten the exposure time thereof are made, followed by dummy image acquisition several times (SC4) and the operation of changing the detection sensitivity and the exposure time back to the previously stored conditions (SC5).

The operation of the present embodiment may be combined with the operations of the first embodiment and the second embodiment.

What is claimed is:

1. An observation apparatus comprising:
   a stage on which a sample serving as an observation target is placed;
   a detection unit which detects light from said sample;
   an imaging optical system which projects the light from said sample onto said detection unit;
   a light shielding member which covers the whole or a part thereof;
   an opening provided in the light shielding member;
   a lid which opens/closes the opening;
   an open/close detection unit which detects the open/close state of the lid;
   a dimmer which limits light incident into said detection unit; and
   a controller which operates said dimmer to reduce the amount of the light incident into said detection unit, when said open/close detection unit detects that said lid has been opened;
   wherein when it is detected that said lid has been closed from the opened state, photodetection operation or image detection operation is executed at least once in a state where the gain, the exposure time, or the photoelectric conversion efficiency of said detection unit is reduced.

2. An observation apparatus according to claim 1, wherein said dimmer is a shutter or a dimming filter.

3. An observation apparatus comprising:
a stage on which a sample serving as an observation target is placed;
a detection unit which detects light from said sample;
an imaging optical system which projects the light from said sample onto said detection unit;
a light shielding member which covers the whole or a part thereof;
an opening provided in the light shielding member;
a lid which opens/closes the opening;
an open/close detection unit which detects the open/close state of the lid;
a dimmer which limits light incident into said detection unit; and
a controller which reduces a gain, an exposure time, or a photoelectric conversion efficiency of said detection unit, so as to thereby set the sensitivity low, when said open/close detection unit detects that said lid has been opened;
wherein when it is detected that said lid has been closed from the opened state, photodetection operation or image detection operation is executed at least once in a state where the gain, the exposure time, or the photoelectric conversion efficiency of said detection unit is reduced.

4. An observation apparatus according to claim 1, wherein said detection unit comprises any one of EM-CCD, PMT, and APD.

5. An observation apparatus according to claim 1, wherein the controller operates the dimmer to reduce the amount of the light incident into the detection unit during observation of the sample, when the open/close detection unit detects that the lid has been opened.

6. An observation apparatus according to claim 3, wherein the controller reduces the gain, the exposure time, or the photoelectric conversion efficiency of the detection unit during observation of the sample, so as to thereby set the sensitivity low, when the open/close detection unit detects that the lid has been opened.

* * * * *